United States Patent [19]

Emoto et al.

[11] Patent Number: 5,070,494
[45] Date of Patent: Dec. 3, 1991

[54] OPTICAL PICKUP DEVICE WITH DUAL-MODE DRIVE MECHANISM

[75] Inventors: Masami Emoto; Masanobu Nishimiya; Akihiko Okamoto, all of Yokohama, Japan

[73] Assignee: Ricoh Company, Ltd., Tokyo, Japan

[21] Appl. No.: 332,749

[22] Filed: Apr. 3, 1989

[30] Foreign Application Priority Data

Apr. 5, 1988 [JP] Japan .................................. 63-83738
Apr. 8, 1988 [JP] Japan .................................. 63-86350
Jul. 25, 1988 [JP] Japan .................................. 63-185077
Jul. 27, 1988 [JP] Japan .................................. 63-187580

[51] Int. Cl.$^5$ ............................................. G11B 7/00
[52] U.S. Cl. ............................... 369/112; 369/44.23; 369/44.17; 369/13; 369/44.15; 360/114; 250/201.5
[58] Field of Search ............... 369/44.11, 44.14, 44.17, 369/44.23, 13, 112, 44.18, 44.15; 360/114; 250/201.5; 350/245, 247

[56] References Cited

U.S. PATENT DOCUMENTS 4,310,910  1/1982  Sherry .................................. 369/116

FOREIGN PATENT DOCUMENTS 0014342  1/1987  Japan .................................. 369/13

Primary Examiner—Roy N. Envall, Jr.
Assistant Examiner—Thang V. Tran
Attorney, Agent, or Firm—Cooper & Dunham

[57] ABSTRACT

An optical pickup device for optically reproducing an information recorded on a recording medium of a magneto-optical disc or a write-only-read-many optical disc, includes a semiconductor laser, an objective lens for converging the laser light emitted by the laser on the recording medium, a photo-detector for detecting a light reflected from the recording medium, a beam splitter for leading the emitted light from the laser to the objective lens and for leading said light reflected by the recording medium to the photodetector, a first phase plate disposed between the beam splitter and the objective lens, a second phase plate disposed between the beam splitter and the photo-detector, and a rotator for rotate the first phase plate in such a manner than the beam splitter forbids to transmit the light reflected by the recording medium into the laser in a case where the recording medium is said write-only-read-many optical disc, and that the beam splitter allows to transmit the light reflected by the recording medium into the laser in a case where the recording medium is the magneto-optical disc.

8 Claims, 7 Drawing Sheets

Fig. 1
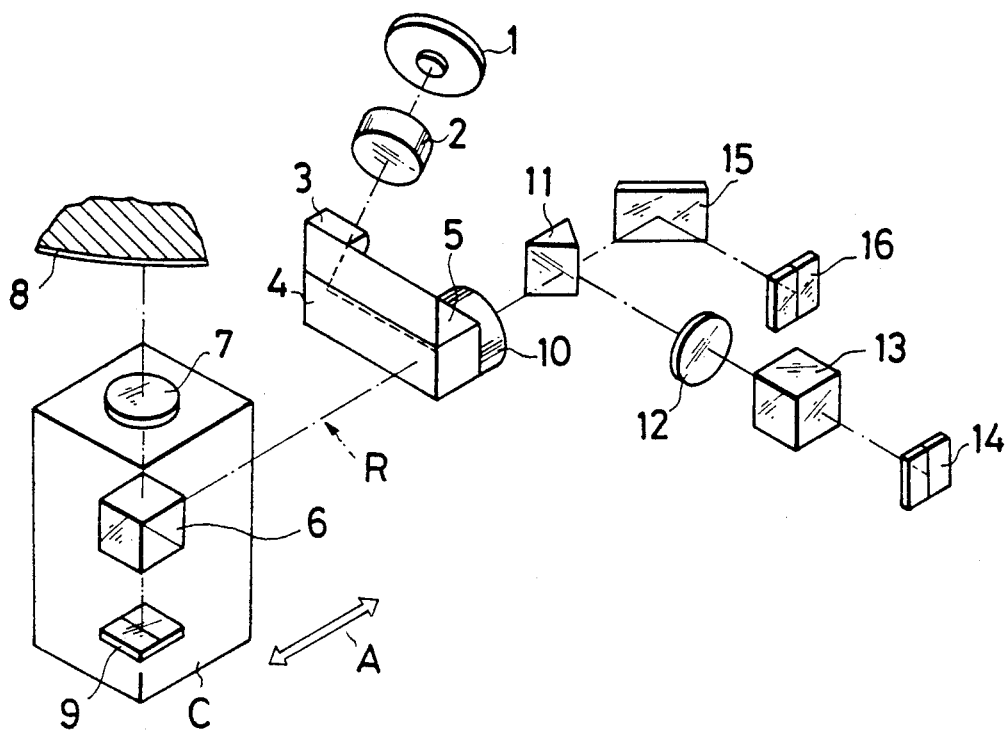
Fig. 2a
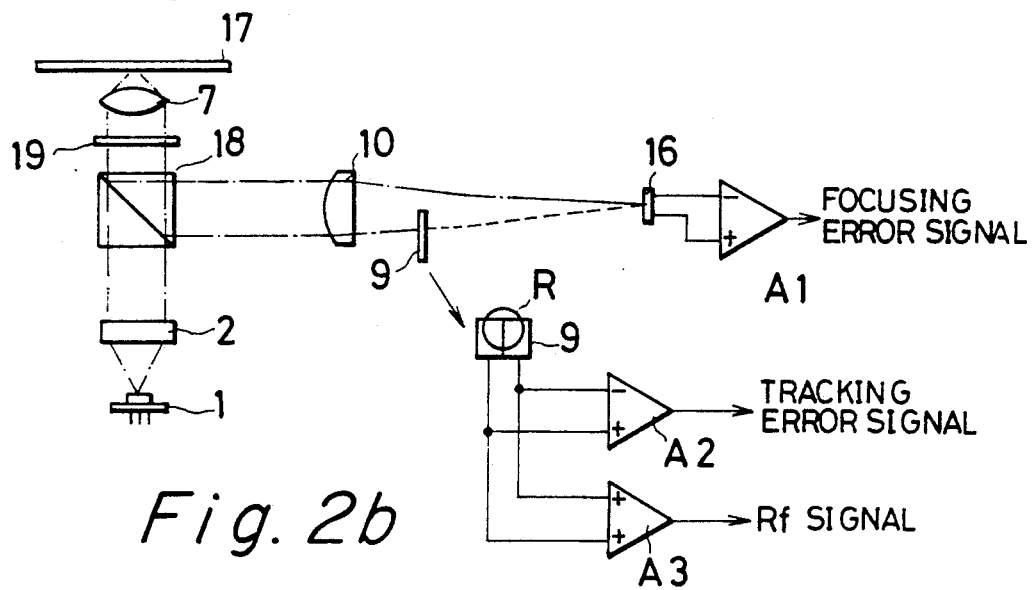
Fig. 2b

Fig. 15
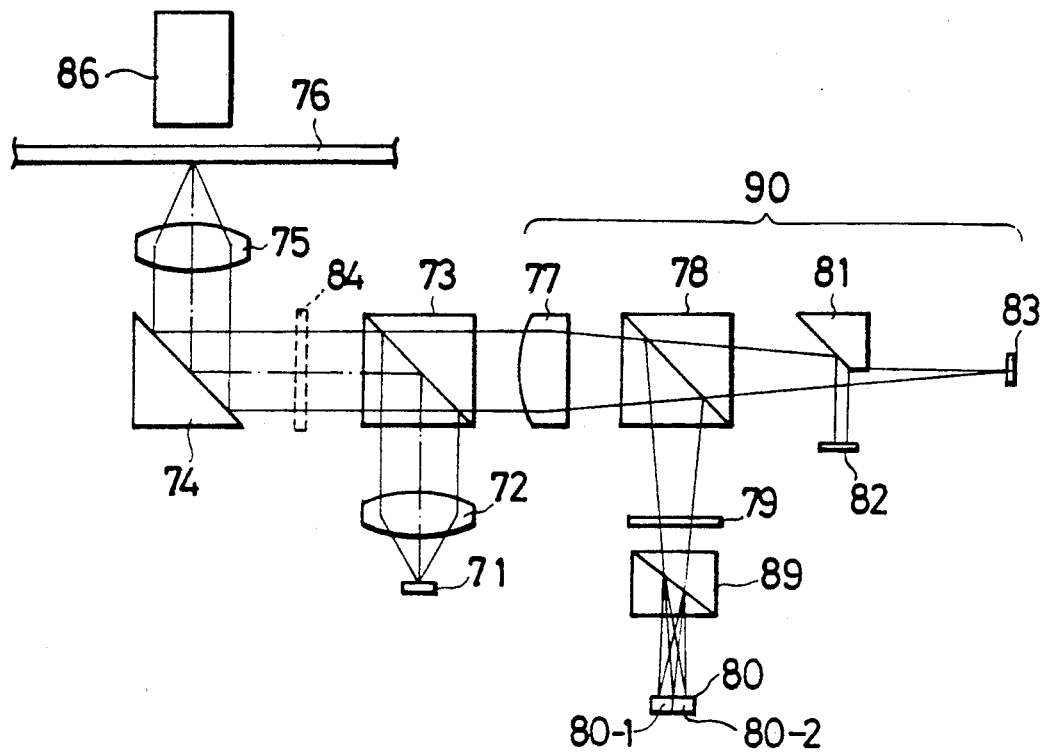
Fig. 16
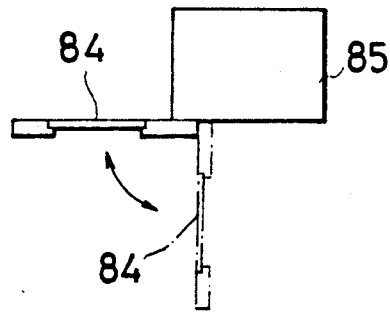
Fig. 17(A)  Fig. 17(B)
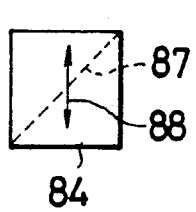 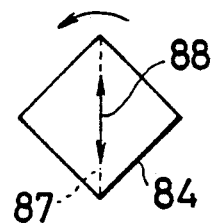

OPTICAL PICKUP DEVICE WITH DUAL-MODE DRIVE MECHANISM

BACKGROUND OF THE INVENTION

The present invention relates to an optical pickup device, particularly relates to an optical pickup device capable of recording and reproducing of information for both optical information recording media of a magneto-optical disc and a write-once-read-many type optical disc (referred to as WORM type optical disc hereafter).

There is widely known read-only optical disc memories (such as the ones for a laser disc and a compact disc) which read and reproduce information signals recorded beforehand on a disc with laser light. In recent years, attention being paid to the largeness of the information recording capacity of an optical disc, attempts is made to bring it into practical use as an information recording medium, for example, a computer memory medium and the like.

As already invented memories utilizing optical discs as information recording media, there is known a WORM type optical disc memory that, in use, permits additional recording of information but does not permit erasing nor rewriting of the information, and a magneto-optical disc memory capable of recording, reproducing and erasing of information by using the magneto-optical effect.

As for a WORM type optical disc, information is recorded as pit patterns on a disc surface as on a conventional read-only optical disc. At the time of a reading operation (pickup), information is read in such a way that a spot of laser light is applied to the pit patterns, the spot light reflected from the disc surface is detected as, for example, a variation of the reflectance of the reflected light, namely, a variation of an amount of the reflected light (light and darkness).

In a WORM type optical disc, what is called, a write-once optical disc, the recording on the same part of the disc is carried out only once but the reading is carried out repeatedly. Recording on a WORM type optical disc is performed by alteration of the reflectance such as forming of pits on the recording surface of the disc or transforming of the crystal state of the surface with the laser light for recording, and reproducing of information is performed by using a difference of the amount of the reflected luminous quantities of laser light for reproducing.

While, in a magneto-optical disc, information is recorded as a variation of the state of magnetization in such a way that a recording position where magnetic field is applied to a position at which the laser light is applied, while carrying the information to be recorded with the laser light for recording. In reproducing, information is reproduced by irradiation of the laser light for reproducing and detection of a variation of the state of polarization in the reflected light.

And a magneto-optical disc is so arranged as to make it possible to recording, reproducing, and erasing of information by using, as a recording medium, a disc with the surface where a magnetic thin film having the magneto-optical effect is formed. To be brief about the principles of recording and erasing of information concerning this magneto-optical disc, firstly the whole surface of a magnetic thin film is first magnetized in the direction perpendicular to the disc surface prior to the information recording, at the time of recording, secondly applying the laser light to the recording position while the weak magnetic field is kept applied in the opposite direction to thereby reverse the state of the magnetization there by a heat of the laser light, consequently information is recorded. At the time of erasing, laser light is applied to the erasing position where the magnetic field is kept applied in the same direction as the magnetization direction magnetized before hand to thereby back the magnetization direction there to the original direction and thus erasing is done.

Information is read by converging laser light on the disc surface making use of the phenomenon (called the magneto-optical effect) that the plane of polarization of the reflected light rotates differently depending on the magnetization direction.

An optical pickup device for a magneto-optical discs can not serve as a combined use with one for WORM type optical disc because the fluctuation in the power of laser light emitted from a semiconductor laser has seriously undesirable influence on a reproducing operation of a WORM type optical disc.

Therefore the conventional optical pickup device can not serve as a combined use as both magneto-optical disc and WORM type optical disc, and the optical pickup device intended for a combined use as both magneto-optical type optical disc and WORM type optical disc is difficult to be realized.

If a conventional optical-pickup device is used as a reproducing device intended for a combined use as both magneto-optical type optical disc and WORM type optical disc, the fluctuation in the power of the reflected light, which is not a problem when reproducing in the magneto-optical way, will drastically increase when reproducing in the WORM way. The fluctuation in the intensity of the reflected light, since it is generated when a spot light is focused on a disc, increases the power to eventually cause deterioration of the medium more at actual reproducing time when focus servomechanism continues to focus every moment than at the time of setting of the reproducing power. Additionally the fluctuation in the luminous quantity causes noise and have undesirable influence on a reproduced signal.

If a single and the same optical pickup ensures recording and reproducing for each optical information recording medium of the magneto-optical disc and the WORM type optical disc, that will be extremely convenient.

In order to realize the optical pickup usable in common to the magneto-optical disc and the WORM type optical disc, the following problems must be settled.

That is, what must be settled is the problem of the output fluctuation due to return light in a semiconductor laser, which is the most suitable for a light source for an optical pickup.

The output of the semiconductor laser, if return light strikes it, fluctuates. This output fluctuation owing to return light is remarkable when the output is small but so decreases its power as to be negligible when the output become large enough. In other words, the output fluctuation becomes serious only when the semiconductor laser is so driven that its output power is low.

SUMMARY OF THE INVENTION

It is therefore an object of the present invention to provide an optical pickup device intended for a combined use as both magneto-optical type optical disc and a WORM type optical disc which prevents such fluctuation of the luminous quantity of a semiconductor laser due to the return light in reproducing on the WORM type optical disc and which ensures recording and reproducing for each optical information recording medium of the magneto-optical disc and the WORM type optical disc.

It is another object of the present invention is to provide an optical pickup device intended for a combined use as both the magneto-optical type optical disc and the WORM type optical disk, which enables to easily change between reproducing on the magneto-optical disc and that on the WORM type optical disc by means of a mechanism of a low cost and a small size.

The object of the present invention can be achieved by an optical pickup device for optically reproducing an information recorded on a recording medium of a magneto optical disc or a write-only-read-many optical disc, comprising:

a semiconductor laser for emitting a laser light;

an objective lens for converging said laser light emitted by said laser on said recording medium;

a photo-detector for detecting a light reflected from said recording medium;

a beam splitter for leading said emitted light from said laser to said objective lens and for leading said light reflected by said recording medium to said photo-detector;

a first phase plate disposed between said beam splitter and said objective lens;

a second phase plate disposed between said beam splitter and said photo-detector; and a moving means for moving said first phase plate in such a manner that said beam splitter forbids to transmit said light reflected by said recording medium into said laser in a case where said recording medium is said write-only-read-many optical disc, and that said beam splitter allows to transmit said light reflected by said recording medium into said laser in a case where said recording medium is said magneto-optical disc.

The above-mentioned optical pickup device according to the prevent invention can prevent such fluctuation of the luminous quantity of a semiconductor laser due to the return light in reproducing on the write-once-read-many type optical disc and can ensures recording and reproducing for each optical information recording medium of the magneto-optical disc and the WORM type optical disc.

The another object of the present invention can be achieved by another optical pickup device having the rotating device which comprises;

a bearing having an outer ring and an inner ring both of which are engaged rotatably with each other, one of said outer ring and said inner ring being fixed to said first phase plate, the other of said outer ring and said inner ring being fixed to a stationary member, a first generating means fixed to said stationary member for generating a magnetic field along a substantially rotational direction of said bearing, and a second generating means fixed to said first phase plate for generating another magnetic field along said substantially rotational direction.

The another optical pickup device according to the present invention enables to easily change between reproducing on the magneto-optical disc and that on the WORM type optical disc by means of a mechanism of a low cost and a small size.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 1 is a schematic view of an optical pickup device for a magneto-optical disc;

FIGS. 2(a) and 2(b) are schematic views of an optical pickup device for a WORM type optical disc;

FIG. 15 is a schematic view of the device of the present invention;

FIG. 16 is an explanatory diagram illustrating the operation of a quarter-wave plate of the device shown in FIG. 15; and FIGS. 17(A) and 17(B) are explanatory diagrams illustrating the output fluctuation of a semiconductor laser caused by return light.

DESCRIPTION OF THE PREFERRED EMBODIMENTS

Figure 3:
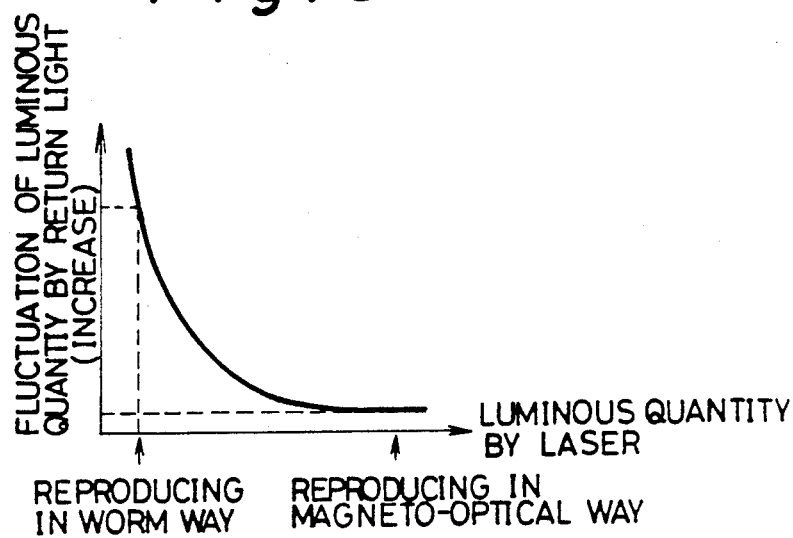
FIG. 3 is an explanatory graph relating to the output fluctuation of a semiconductor laser caused by return light in an optical pickup device.

Each optical pickup device used for a magneto-optical disc and a WORM type optical disc will be described referring to the drawings, hereinafter.

FIG. 1 is a schematic view of an optical pickup device for a magneto-optical disc. In this optical pickup device, light from a semiconductor laser 1 is changed into parallel rays by means of a coupling lens 2 and the rays are shaped into a beam by means of a beam forming prism 3. The light passing through the prism 3 is reflected by a roof prism 4 as shown with a broken line in the figure, then is reflected to the side of a carriage C at the first beam splitter 5. And, the carriage C is free to move along a radial direction of a magneto-optical disc 8 as a recording medium.

The carriage C is provided with a second beam splitter 6, an objective lens 7 and a photo detector 9. The splitter 6 reflects to the lens 7 the laser light led from the splitter 5 and the lens 7 converges the laser light from the splitter 6 into a light spot with a diameter of about 1 μm on the disc 8.

And then, the reflected light of the light spot from the disc 8 is led to the splitter 6 through the lens 7. A part of the incident light of the splitter 6 is led to the detector 9 for detecting a tracking signal and the other part is reflected to the splitter 5. The light reflected to the splitter 5 passes through the splitter 5 and is converged to a converged light by a converging lens 10. Then a knife edge shaped separating mirror 11 separates the converged light and reflects a part of the separated light. The part of the separated and reflected light is led to a magneto-optical detector 14 through a half-wave plate (a λ/2 plate) 12 and a Wollaston prism 13, thereby, information signals are detected by the prism 13. The other part of the separated and non-reflected light is reflected by a reflecting mirror 15, and strikes a photo detector 16 for detecting a focus.

FIG. 2 is a schematic view of an optical pickup device for a WORM type optical disc. In FIG. 2, the elements with the reference numerals in FIG. 1 have the same function as the corresponding elements in FIG. 1.

In the optical pickup device shown in FIG. 2, if laser beam emitted from the laser 1 is a linearly polarized light, the linearly polarized light (S-polarized light) is changed into parallel rays by a coupling lens 2, passes through a polarization beam splitter 18, and is converged on a WORM type optical disc through a quarter-wave plate (a λ/4 plate) 19 and the lens 7. Having passed through the λ/4 plate 19. The light which strikes on to the disc 17 is a circularly polarized light, and the reflected light from the disc 17 is also circularly polarized.

And, having passed through the λ/4 plate 19 again, the reflected light from the disc 17 is linearly polarized and this linearly polarized light differs by 90° in phase with respect to the light emitted from the laser 1 (P-polarized light). Therefore, this linearly polarized light (P-polarized light) is reflected more than 99% by the splitter 18 and led to the converging lens 10. And, the converged light passing through the lens 10 strikes on the elements 16 and 9, and then detected as a focusing error signal and a tracking error signal through two amplifiers A1 and A2, respectively. The information signal recorded on the disc 17 is detected a an total signal (Rf signal) of relating to the sum of the light irradiated to the element 9.

In an optical pickup device for a magneto-optical disc as shown in FIG. 1, the reflected light from the disc 8 consists of the light each of which has its own direction of polarization angle in accordance with a magnetization direction at a reflection point on a magneto-optical medium (a magnetic thin film), the prism 13 separates its incident light according to the direction of polarization of each light. Therefore a magneto-optical signal recorded on the disc 8 is detected as a difference of the intensities of the two incident light by the detector comprising the two-divided photo-detector.

However, since the difference of the polarization angles (Kerr turning angle) is minute, the disc 8 has to be irradiated with linearly polarized light with high accuracy.

For this reason, an optical pickup device for a magneto-optical disc can not be adapted such that the incident light and the reflected light is separated by means of the λ/4 plate 19 and the splitter 18 as in the optical pickup device for the WORM type optical disc as shown in FIG. 2. As a result, in the optical pickup device for the magneto-optical disc, part of the reflected light from the disc 8 is reflected by the splitter 5 to return toward the laser 1. But, since the laser 1 and the disc 8 are in conjugate relationship through the lens 2 and the lens 7, if part of the light emitted by the laser 1 returns to the laser 1, the lights interferes with each other, and a light path linking the laser 1, the lens 2 and 7, and the disc 8 acts as a kind of resonator, which causes a phenomenon that luminous quantity of the emitted light from the laser 1 fluctuates, or a phenomenon called "the output fluctuation of a semiconductor laser due to return light".

However, this output fluctuation of a semiconductor laser due to return light has, in general, such a characteristic with respect to luminous quantity of the emitted light from the laser 1 as shown in FIG. 3 and has little influence in reproducing on the magneto-optical disc.

Information is recorded through the method of forming of pit patterns with removal or acidification of a solvent of a recording medium in the WORM type optical disc 17, while information is recorded by inverting magnetization of a magneto-optical medium in the magneto-optical disc 8. For this reason, if luminous quantity emitted by the laser 1 or reproduced luminous quantity is raised too much in optical reproducing on the WORM type optical disc 17, the medium may be deteriorated. Accordingly, reproduced luminous quantity for the WORM type optical disc is as small as about one-fifth of that for a magneto-optical disc.

Therefore, when the optical pickup device shown in FIG. 1 is used as a reproducing device intended for a combined use as both the WORM type optical disc and the magneto-optical disc, the fluctuation of the luminous quantity of a semiconductor laser due to return light which is almost negligible in magneto optical reproduction results in a serious problem causing undesirable influence.

As occurring when the light spot is focused on the disc, the fluctuation of the luminous quantity due to return light increases its power to be possible to deteriorate the quality of a recording medium at the time of setting output power more than at the time of actual reproducing (usually, in a focused state at every moment by means of focus servocontrol).

This fluctuation also results in another serious problem causing undesirable influence, as noise on a reproduced signal.

As described above, the optical pickup device for the magnetic optical disc shown in FIG. 1 can not serve as the one for the WORM type optical disc because the fluctuation in the luminous quantity of light emitted from the laser 1 has seriously undesirable influence on a reproducing operation for the WORN type optical disc.

Therefore, for the above reasons, neither the optical pickup device shown in FIG. 1 nor FIG. 2 can serve a combined use as for both the magneto-optical disc and the WORM type optical disc, and the optical pickup device intended for a combined use as both magneto-optical disc and the WORM type optical disc is difficult to be realized.

Now, a magneto-optical disc needs considerably strong light to reproduce signal with sufficient amplitude. In case of reproduction on the magneto-optical disc, care may not be taken to the output fluctuation of a semiconductor laser due to return light because the semiconductor laser is to be so driven as to give high output power. On the other hand, in reproducing information on the WORM type optical disc, applying too strong light to the disc causes the recorded information to change, and that will prevent reproducing thereafter. For this reason, as shown in FIG. 3, the semiconductor laser under reproducing information has to be so driven as to give high output power for the magneto-optical disc and low output power for the WORM type optical disc. Therefore, the output fluctuation of the semiconductor laser due to return light becomes a problem as the WORM type optical disc.

Figure 4:
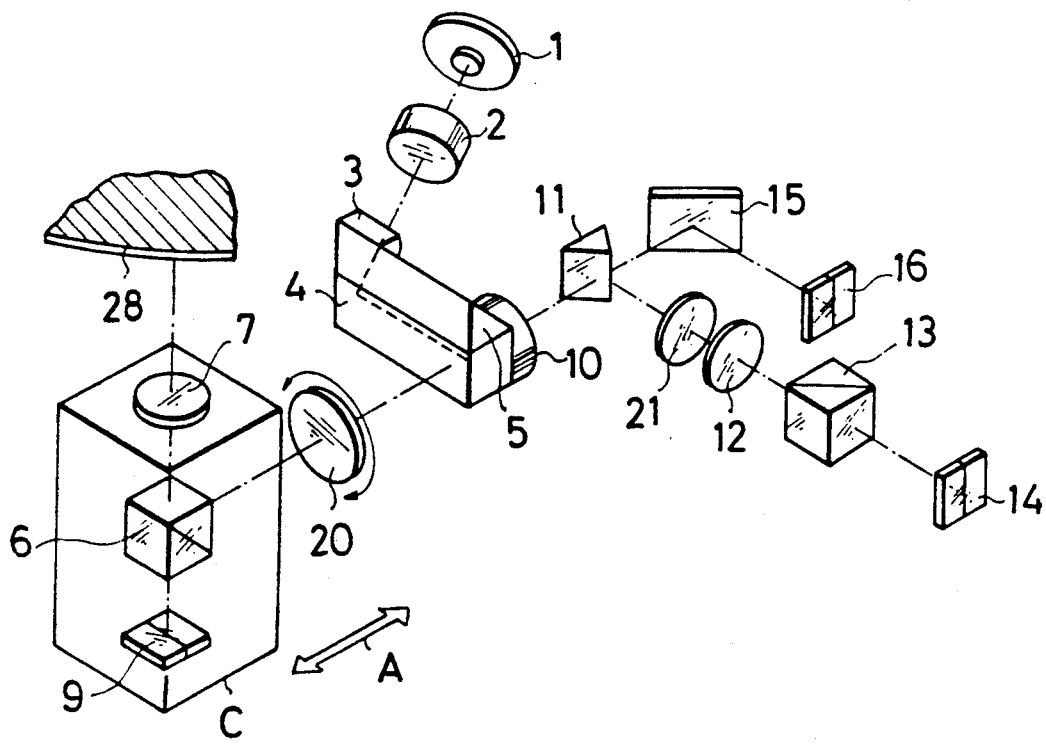
FIG. 4 is a schematic view of an embodiment of the device according to the present invention.

Referring to FIG. 4, there is shown an embodiment of the first device according to the present invention. The device of FIG. 4 comprising a semiconductor laser 1 for emitting linearly-polarized light, a coupling lens 2 for making the emitted light from the laser 1 into parallel rays, a beam-shaping prism 3 for shaping parallel rays into a beam of light, a roof prism 4, a first beam splitter 5, a second beam splitter 6, an objective lens 7, a recording medium 28 of a magneto-optical disc or a WORM type optical disc, a photo detector 9 for tracking error detection, a converging lens 10, a separation mirror 11 of a knife-edge shape, a half wave plate (a $\lambda/2$ plate) 12, a Wollaston prism 13, a magneto-optical signal detector 14, a reflecting mirror 15, and a photo detector 16 for focussing error detection.

Here the optical pickup device shown in FIG. 4 is constructed basically in the same way as that of a magneto-optical disc shown in FIG. 1. In FIG. 1, elements having the identical numeral function in the same way.

The device shown in FIG. 4, in addition to the optical pickup device shown in FIG. 1, with the first quarter wave plate (a $\lambda/4$ plate) 20 between the splitters 5 and 6, and the second quarter wave plate (a $\lambda/4$ plate) 21 between the mirror 11 and the $\lambda/4$ plate 20. The $\lambda/4$ plate 20 is adapted to rotate depending on the kind of a recording medium, that is, whether it is the magneto-optical disc the WORM type optical disc. In other words, the optical pickup device shown in FIG. 4 is adapted to change its modes between a magneto-optical mode and a WORM type mode based on a rotational position of the $\lambda/4$ plate 20 to thereby reproduce on each of a magneto-optical disc and a WORM type optical disc.

The optical pickup device in each mode mentioned above will be described, hereinafter.

Figure 5:
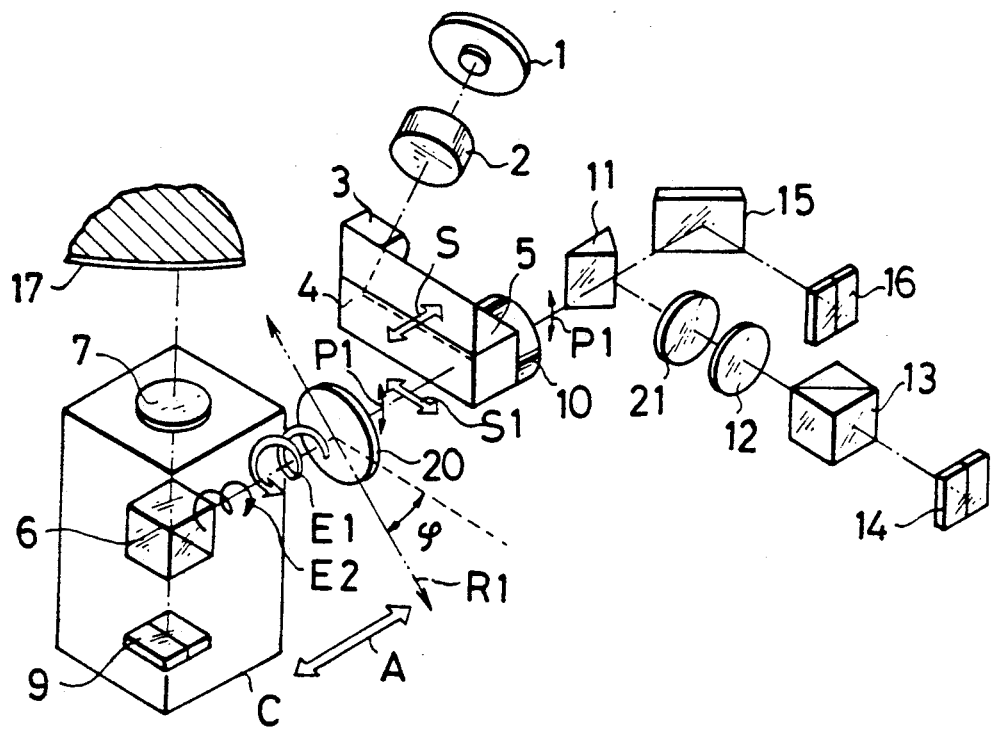
FIG. 5 is an explanatory view illustrating the operation of the device of FIG. 4 in the WORM type mode.

First, the WORM type mode is described. FIG. 5 is an explanatory view illustrating the operation of the optical pickup device shown in FIG. 4 in the WORM type mode. In FIG. 5, the light emitted by a laser 1 passes through the lens 2, the prisms 3 and 4 and strikes the splitter 5 as luminous flux S of S-polarized light. The splitter 5 reflects 75% and passes 25% of S-polarized light, and passes 99% of P-polarized light.

The luminous flux S1 (75% of the luminous quantity of the emitted light) of S-polarized light reflected by the splitter 5 becomes circularly-polarized light E1 after passing through the $\lambda/4$ plate 20. Here the $\lambda/4$ plate 20 is so positioned that its optic axis R1 is at the angle of 45° with respect to the vibration direction of the S-polarized light.

The circuitry-polarized flux E1 passing through the $\lambda/4$ plate 20 is reflected upward in the figure, that is, in the direction of the disc 17 by the splitter 6 and focused on the disc 17 by the lens 7. And the reflected light from the disc 17 returns to the $\lambda/4$ plate 20 as the luminous flux E2 of circularly-polarized light and passes again through the $\lambda/4$ plate 20 to thereby becomes linearly-polarized light. The vibration direction of this linearly-polarized light. The vibration direction of this linearly-polarized light is at a right angle with that of the S-polarized light S1 mentioned above and is P-polarized light P1 for the splitter 5. Since the splitter 5 passes P-polarized light more than 99%, as is described above, almost none of the reflected light (P-polarized light) from the disc 17 returns to the laser 1. Consequently, the light passing through the splitter 5 and the lens 10 is separated by the mirror 11 in two directions. One is led to the detector 14 comprising a two-divided photo-detector through the $\lambda/4$ plate 21 and the $\lambda/2$ plate 12 and the prism 13, and the other is led to the element 16 through the mirror 15.

In the WORM type mode, information signal from the WORM type optical disc is detected as the sum of output signals from each photo-detector of the detector 14 comprising the two-divided photo-detector.

Figure 6:
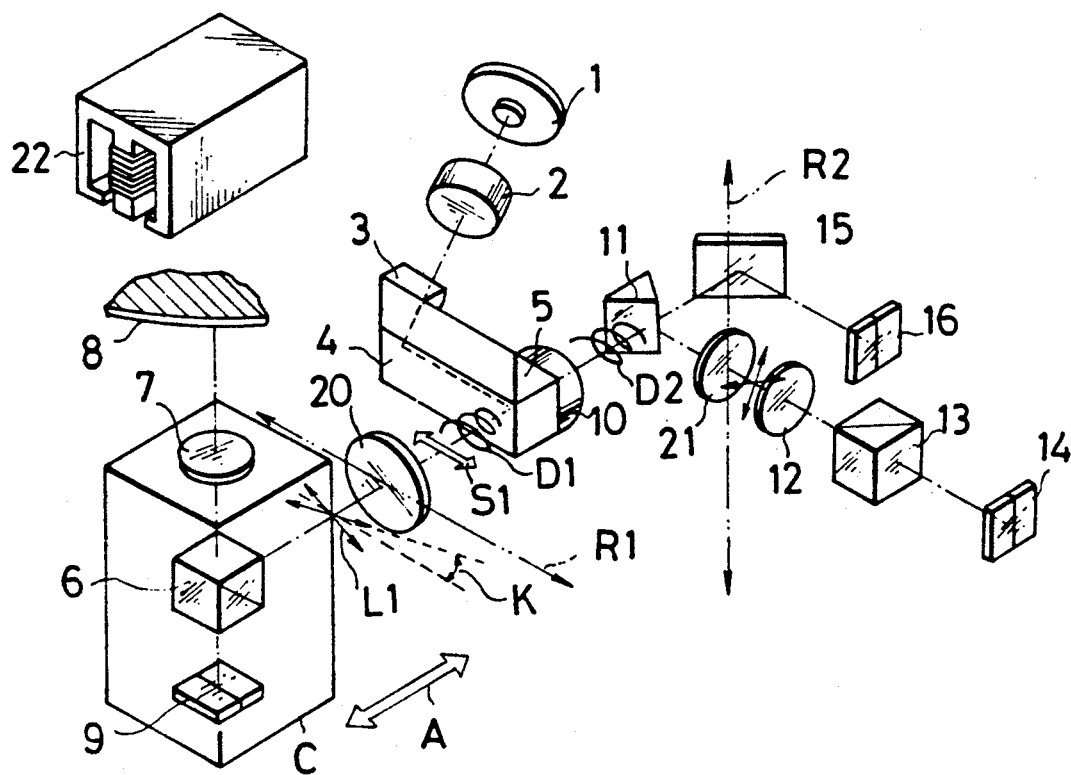
FIG. 6 is an explanatory view illustrating the operation of the device of FIG. 4 in the magneto-optical mode.
Figure 7:
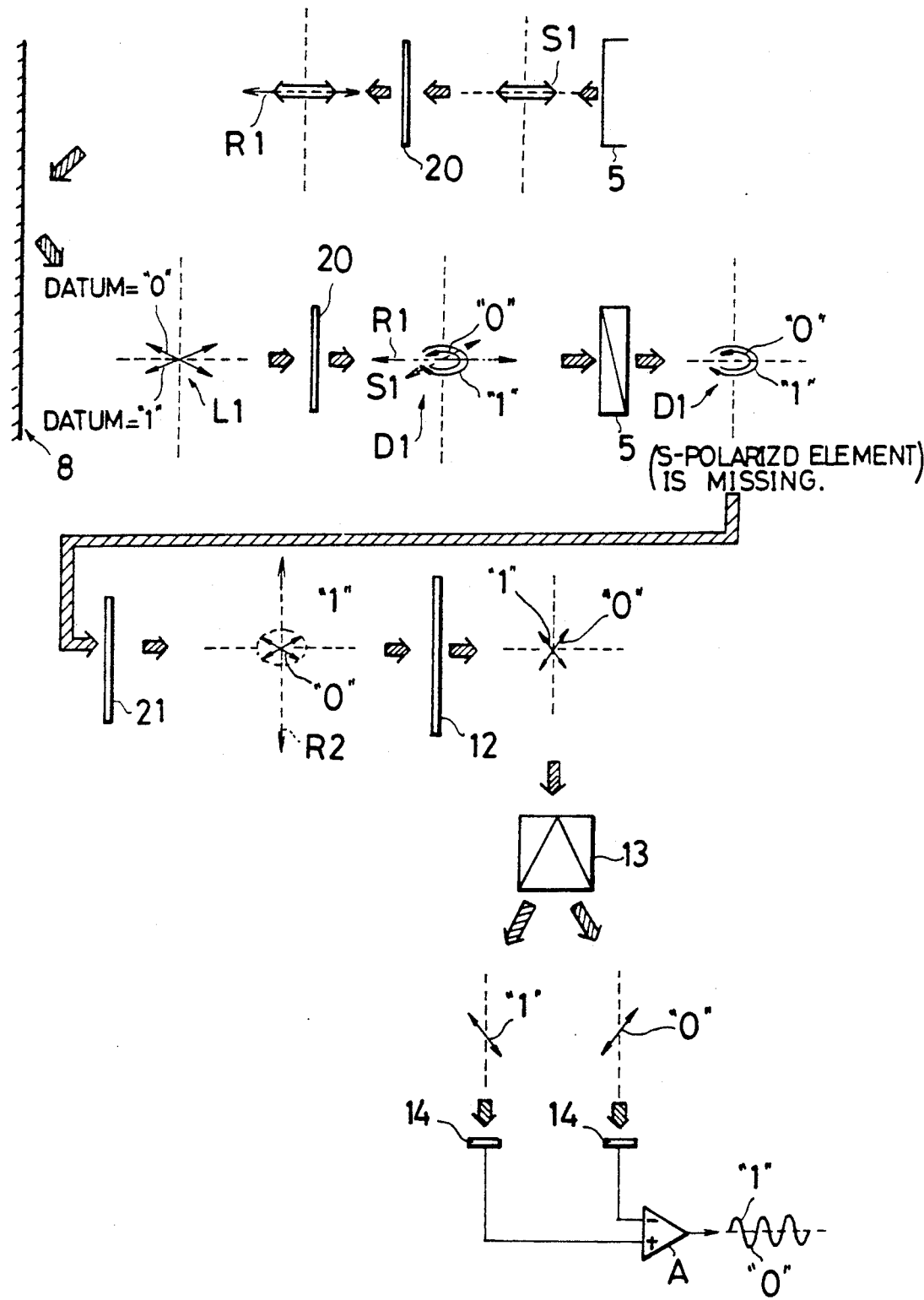
FIG. 7 is a schematic diagram showing the state in which the device of FIG. 4 detects information in the magneto-optical mode.

Secondly, referring to FIGS. 6 and 7, the magneto-optical mode is described. FIG. 6 is an explanatory view illustrating the operation of the optical pickup device shown in FIG. 4 in the magneto-optical mode. FIG. 7 is a schematic diagram showing the state in which the device shown in FIG. 4 detects information int he magneto-optical mode. A magnetic field used in recording or erasing the information is applied to the disc 8 by a electromagnet head 22.

In FIGS. 6 and 7, as in the case of the WORM type mode, the light emitted from the laser 1 goes through the lens 2 and the prisms 3 and 4, and as the luminous flux S of S-polarized light, strikes on the splitter 5 and reflects toward the $\lambda/4$ plate 20.

Here, in the case of the magneto-optical mode, the $\lambda/4$ plate 20 is so rotated as to make its optic axis R1 identical with the vibration direction of the luminous flux S1 of S-polarized light from the splitter 5, which thereby enables the luminous flux S1 to pass without any disturbance through the $\lambda/4$ plate 20. The luminous flux S1 passing through the $\lambda/4$ plate 20 passes through the splitter 6 and the lens 7, and strikes on the disc 28 as linearly-polarized light (S-polarized light).

And, the light reflected by the disc 8 becomes a linearly-polarized light which is rotated by a Kerr turning angle depending on the magnetization direction (binary-coded in "0" and "1" corresponding to the magnetization direction) of the recorded data. Since the linearly-polarized light L1 which is reflected by the disc 28 is slanted by a minute angle of K (a Kerr turning angle) with respect to the optic axis R1, this linearly-polarized light L1 changes into elliptically-polarized light D1 through the $\lambda/4$ plate 20.

Since as previously described, the splitter 5 transmits 25% of S-polarized light or 99% of P-polarized light, the elliptically-polarized light D1 mentioned above reaches a mirror 11 in a condition that its ellipticity is changed.

About 75% of S-polarized component of the reflected light is reflected by the splitter 5 and returns to strike the laser 1. In this cases, the return light causes such little influence as is actually negligible because the laser 1 is so driven as to generate a high output power.

The elliptically-polarized light reflected by the mirror 11 passes through the $\lambda/4$ plate 21 to vary again into linearly-polarized light. That is, the $\lambda/4$ plate 21 changes again the light elliptically-polarized by the $\lambda/4$ plate 20 into the linearly-polarized light and for this purpose the optic axis R2 of the $\lambda/4$ plate 21 is positioned at a right angle with respect to the optic axis R1 of the $\lambda/4$ plate 20.

Since the linearly-polarized light which passes through the λ/4 plate 21 and returns to its original condition is rotated by a Kerr turning angle depending on the magnetization direction of the recorded datum as is previously described, the rotation direction of the linearly-polarized light corresponds to the information datum ("0" or "1"). Taking advantage of the difference of polarization angle by the contrast of the rotation direction, the λ/2 plate 12 and prism 13 separates the light with two different rotation directions. The lights with each rotation direction are detected by the detector 14 comprising a two-divided photo-detector. The rotation direction of the incident light is detected from the difference of output signal of the two-divided photo-detector, and the information datum ("0" or "1") is detected. The sequential states up to information detection are shown in a schematic diagram shown in FIG. 7.

Since in the embodiment of the optical pickup device according to the present invention, to rotated the λ/4 plate 20 makes it possible to change over the modes between the magneto-optical mode and the WORM type mode corresponding to whether a recording medium to be used is the magneto-optical disc or the WORM type optical disc, the optical-pickup device intended for a combined use as both the magneto-optical type optical disc and the WORM type optical disc can be put into practical use.

Additionally, in the WORM type mode, since return light to the laser 1 which is reflected by the disc 8 is prevented almost perfectly, fluctuation in the luminous quantity of the emitted light from the laser 1 is surely prevented, and undesirable influence caused by fluctuation in the luminous quantity of the emitted light which is a problem in a conventional optical pickup device is perfectly prevented.

And further, in the WORM type mode, the λ/4 plate 21 does not cause any undesirable influence on this detection of luminous quantity, because information is detected as the sum of output signals from each photo-detector of the detector 14 comprising the two-divided photo-detector, that is, as the whole luminous quantity of the incident light to the detector 14.

Figure 8:
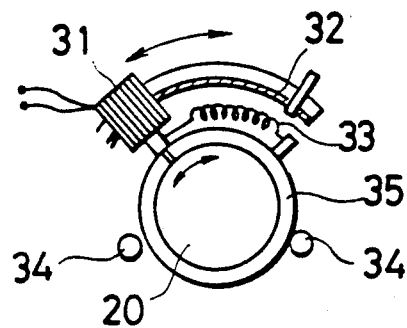
FIG. 8 is a schematic view of an embodiment of a rotating device of a half-wave plate according to the device of the present invention.
Figure 9:
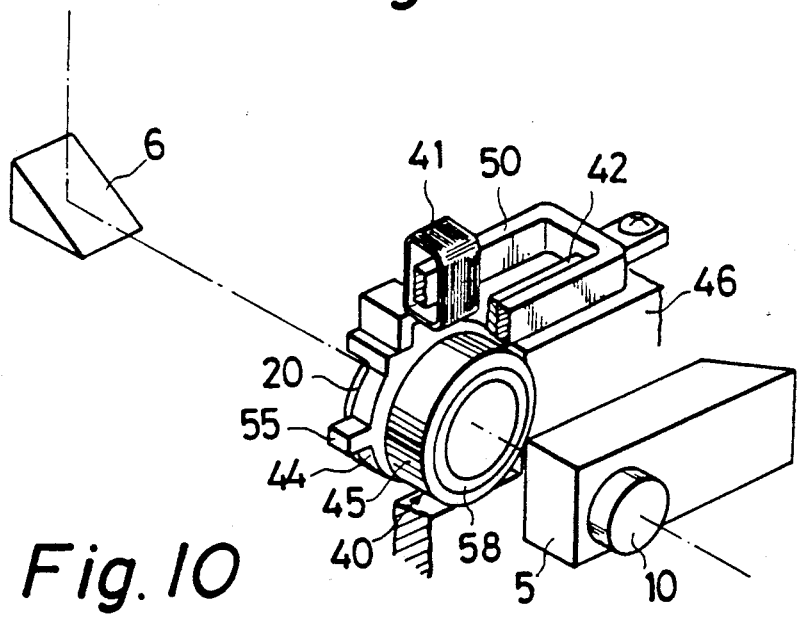
FIG. 9 is a perspective view of another embodiment of a rotating device of a half-wave plate according to the device of the present invention.

Now, rotation of the λ/4 plate 20, which changes over the modes between the magneto-optical mode and the WORM type mode in the embodiment of the optical pickup device according to the present invention, can be carried out easily by using, for example, a rotating device shown in FIG. 8.

The rotating device shown in FIG. 8 comprising; an electromagnetic coil 31, a guide 32 of a permanent magnet, a spring 33, a holder 35 for holding the λ/4 plate 20, bearings 34 for supporting rotatably the holder 35. The rotating device shown in FIG. 8 is adapted to electrify the coil 31 corresponding to each of the magneto-optical mode and the WORM type mode, to move the coil 31 along the guide 32, and to rotate the holder 35 connected to the coil 31 and supporting the λ/4 plate 20 to thereby rotate the λ/4 plate 20 by a predetermined angle.

Distinction and switching of the magneto-optical mode and the WORM type modes to be used may be made by a user's judgement and by means of a switch and the like, or may be made automatically by detecting the mark put on the optical disc cartridge.

Also, in the optical pickup device shown in FIGS. 4 to 6, the optical pickup device with the same function and effect can be also realized even by putting the λ/4 plate 20 in and out the light path instead of using the λ/4 plate 21. However, this method is not advisable in that miniaturization and manufacturing cost will increase, because a mechanism for putting the λ/4 plate 20 in and out will become complicated and extra space for putting in and out will be needed.

And also, in the optical pickup device shown in FIGS. 4 to 6, as the λ/4 plate 21 and the λ/2 plate 12 can be made in one body, the space for furnishing is not necessary to increase.

FIGS. 9 to 14 show other embodiment of the rotating device of the λ/4 plate 20. In FIGS. 9 to 14, the numeral 40 designates a ball bearing comprising an outer ring 45 and an inner ring 58 both of which are engaged rotatably with each other as is same as what is known. The inner ring 58 of the bearing 40 is fixed to a ring-shaped rotating element 44 at one end thereof. The λ/4 plate 20 is mounted on the rotating member 44.

On the other hand, the outer ring 45 of the bearing 40 is mounted on the optical pickup main body 46. Therefore, the inner ring 58, the rotating element 44 and the λ/4 plate 20 connected integrally with each other is freely rotatable relative to the optical pickup main body 46 and the outer ring 45 fixed to the main body 46. The central axis of the bearing 40 is so arranged that it coincides with the optical axis between the prism 5 and the splitter 6.

A coil 41 wound in a frame shape is fixed to the outer circumference of the rotating element 44. Although the coil 41 may be fixed to the rotating element 44 in such way as is thought suitable, in the embodiment shown in the figure, the coil 41 is fixed to the rotating element 44 in the way that a fixing element 53 of a inverted-U shape fixed to the outer side of the coil 41 is engaged and fitted with a block 54 formed by projecting integrally out of the outer circumference of the rotating element 44.

A rectangularly annular yoke 50 is fixed to the photo-pickup main body 46 in the vicinity of the rotating element 44 and one side of the yoke 50 penetrates through the coil 41 with enough interspaces against the both inner face of the coil 41. A permanent magnet 42 is fixed to the inner face of the other side of the yoke 50 opposite to the one side of the yoke 50 penetrating the coil 41. The magnetic field is applied between the permanent magnet 42 and the other side of the yoke 50 both of which are positioned at a constant interspace apart.

The magnetic field is substantially perpendicular to the plane of revolution of the rotating element 44. The coil 41 is positioned in the magnetic field. The coil 41 is charged with a direct current of one direction or the opposite direction depending on which of the magneto-optical mode and the WORM type mode. Since the direction of this electric current is almost perpendicular to the direction of the above magnetic field. To electrify the coil 41 generates a driving force perpendicular to both the above magnetic field and the above current according to the principle of a voice coil motor or a linear motor and rotates the λ/4 plate 20 fixed to the rotating element 44 in the plane perpendicular to the optical axis.

Figure 10:
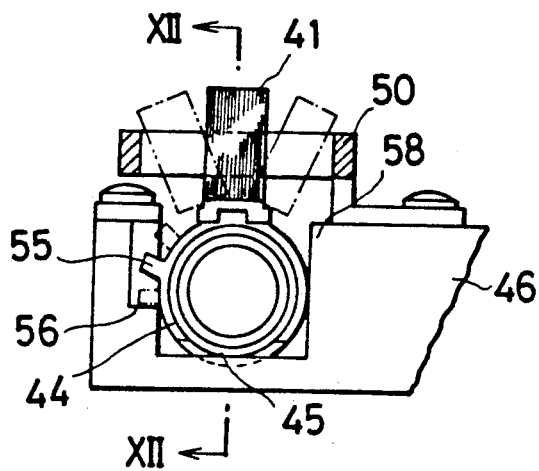
FIG. 10 is a front view of the device of FIG. 9.
Figure 11:
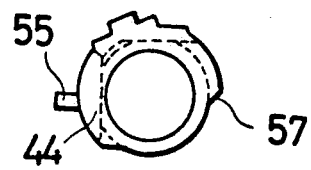
FIG. 11 is a front view of the rotating element of the device shown in FIG. 9.
Figure 12:
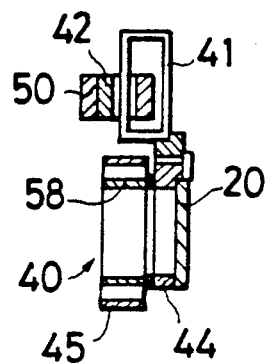
FIG. 12 is a section view with respect to the line XII—XII of FIG. 10.
Figure 13:
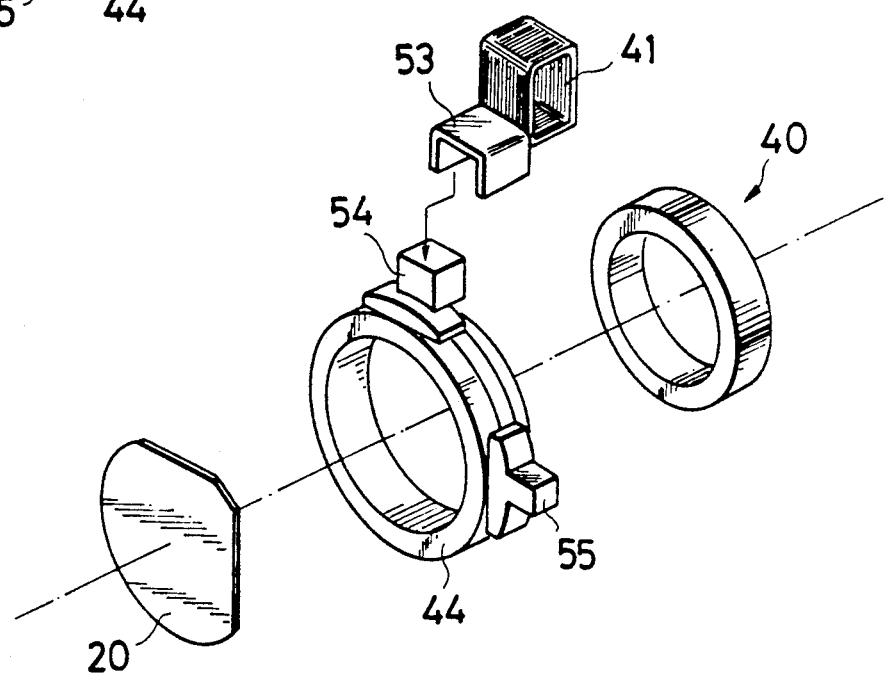
FIG. 13 is an exploded perspective view of the device of FIG. 9.

A counterclockwise rotation limit of the rotating element 44 in FIG. 10 is defined by a stopper 56 of the pickup main body 46 for stopping a projecting portion 55 formed over the circumference of the rotating element 44. A clockwise rotation limit of the rotating element 44 in FIG. 10 is defined by a stopper portion 58 of the pickup main body 46 for stopping the step portion 57 of the circumference of the rotating element 44. The two limits of the rotation range corresponds respectively to the magneto-optical mode and the WORM type mode.

Distinction and switching of the magneto-optical mode and the WORM type mode may be made by user's judgement and by means of a switch and the like, or may be made automatically by detecting the mark or the like put on an optical disc cartridge. And the coil 41 is charged with a current in the direction depending on which of the magneto-optical mode and the WORM type mode. Since the direction of the optic axis of the λ/4 plate 20 as a phase plate, is changed over depending on whether a recording medium is the magneto-optical disc or the WORM type optical disc, fluctuation of the luminous quantity of the emitted light, especially in the case of the WORM type mode, can be prevented.

To position the optic axis of the λ/4 plate 20 in the right direction in each mode, the rotating element 44 should not wobble when rotated to its rotation limit. For this purpose, the projecting portion 55 may be kept in the abutting condition on the stoppers 56, 57 in such a way that the coil 41 is kept charged with the current to maintain its current even after the coil 41 has rotated the rotating element 44.

Figure 14:
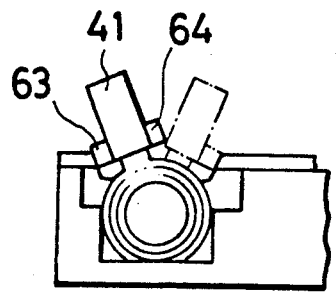
FIG. 14 is a front view of a further embodiment of rotating device of a half-wave plate according to the device of the present invention.

A permanent magnets 63 and 64 may be fixed to both sides of the rotating direction of the coil 41 as shown in FIG. 14, and may be made to stick to the pickup main body 46 or the like at the position of the rotation limits of the coil 41. In the embodiment shown in FIG. 14, after charging the coil 41 with a current has rotated itself, the coil 41 does not need the current any more.

The inner ring 58 of the ball bearing 40 may be fixed to the main body 46, and the outer ring 45 may be assigned to a rotator and the rotating element 44 and the λ/4 plate 20 fixed hereto, may he fixed to the outer ring 45.

The yoke 50 may be made in a arc along the rotating direction of the coil 41.

FIG. 15 shows an embodiment of the third device according to the present invention, comprising; a semiconductor laser 71, a coupling lens 72, a beam splitter 73, a polarizing prism 74, an objective lens 75, a optical information recorded medium 76, a converging lens 77, a beam splitter 78, a half wave plate (a λ/2 plate) 79, a photo-detector 80, a knife-edge prism 81, photo-detectors 82 and 83, a quarter-wave plate (a λ/4 plate) 84, magnetic head 86, and a Wollaston prism 89.

As shown in FIG. 16, the λ/4 plate 84 is adapted to be changeable between the two positional states each designated with solid lines and broken lines by means of the rotating device 85, for example a solenoid lever or the like.

First, recording and reproducing in a case where the medium 76 is a magneto optical disc will be described.

When the medium 76 is a magneto-optical disc, the λ/4 plate 84 is set by the rotating device 85 at the positional state of solid lines shown in FIG. 16, so that the λ/4 plate 84 is set put out of the optical path.

On recording the information, an output of the laser 71 is so modulated as to generate a high power, for example, about 20 mW according to the information while the disc kept is rotated. Light modulated with its intensity according to the information is led to the magneto-optical disc through the lens 72, the splitter 73, the prism 74, and the lens 75.

The light is changed into the parallel luminous flux by the lens 72 and is converged into a spot with a diameter of about 1 μm on the magneto-optical disc.

Therefore, in this embodiment, the lens 72, the splitter 73, the prism 74, and the lens 75 constitute an optical system for a luminative optical path, the optical path from the laser 71 to the magnetic optical disc is an illuminative optical path.

During recording information, the magnetic field of a constant intensity such as 500 Oe is applied at a focused position of a spot shape with the head 86. Then the information carried by the irradiated light of the disc is recorded as a variation of magnetized states of the disc.

On reproducing, the head 86 stops to apply the magnetic field and the laser 71 is so driven as to generate about 5 mW. The light reflected at this time from the magnetic optical disc passes reversely the illuminative optical path through the lens 75, the prism 74, and the splitter 73 to turn away from the illuminative optical path, to thereby strike on the lens 7 and become converging light flux, and strike on the splitter 78. One of the separated light passes through the λ/2 plate 79 and the prism 89 to strike on the photo detector 80. The detector 80 is a two-divided photo detector which provides magneto-optical information as a difference of each signal from the two photo-detecting parts 80-1 and 80-2.

The other light through the splitter 78 is separated by the prism 81 for the two-divided photo-detectors 82 and 83. The photo-detectors 82 and 83 detects a focusing error signal by means of the widely known knife-edge method and a tracking error signal each as a difference of signals from each photo-detecting part of themselves, respectively. These focussing error signal and track error signals are led to each servo-system for controlling of focussing and tracking.

As it is clear from the description above, in this embodiment, a photo-detecting system 90 is constituted by the lens 77, the splitter 78, the λ/2 plate 79, the prism 89, the prism 81, and the photo-detectors 80 and 82 and 83.

Now, laser light emitted from the laser 71 is S-polarized and the splitter 73 transmits about 70% of S-polarized light and about 100% of P-polarized light. Therefore, about 70% of the emitted light from the laser 71 strikes on and is reflected from the magneto-optical disc, the reflected light includes P polarized component owing to rotation of the plane of polarization depending on magneto-optic information. Almost 100% of this P-polarized component passes through the splitter 73 to strike the photo-detecting system. About 30% of S-polarized element of the reflected light also passes through the splitter 73 to strike the photo detecting system.

About 70% of S polarized component of the reflected light is reflected by the splitter 73 and returns to strike the laser 71. In this case, the return light causes such little influence as is actually negligible, because the laser 71 is so driven as to generate a high output power of about 5 mW.

The information recorded on the magnetic optical disc is erasable. All has to be done for this is only for a revolving magnetic optical disc to be irradiated by laser light of a constant intensity with the laser 71 constantly-driven to generate high output power of about 20 mW in the constant magnetic field, for example, about −500 Oe of the direction reverse to one applied on recording by means of the magnetic head 16.

Secondly, recording and reproducing in a case where the medium 76 is the WORM type optical disc will be described.

In this case, in the rotating device 85 shown in FIG. 16, the λ/4 plate 84 is set in the positional state illustrated by broken lines to be placed in the illuminative optical path.

On recording, the disc is rotated with the head 86 stopped, and the laser 71 is driven at the output power of about 15 mW to be controlled according to information with the WORM type optical disc, so that the informations are recorded as a variation of reflectances of the recording surface of the disc. At this time, since the optic axis of the λ/4 plate 84 is oblique at the angle of 45° with respect to the polarization direction of the incident illuminative light, when reflected by the splitter 73 and passed through the λ/4 plate 84, S-polarized light from the laser 71 becomes circularly-polarized light and strikes on the WORM type optical disc to record the information.

On reproducing, the laser 71 is so driven that it emits laser light of constant low intensity of about 1 mW. At this time too, circularly polarized light strikes on the WORM type optical disc to be reflected as circularly-polarized light. The reflected light transmits against the illuminative optical path and passes through the λ/4 plate 84 to be changed into P-polarized light. Since nearly all P-polarized light passes through the splitter 73 to strike on the photo-detecting system 90. Therefore, optical information can be detected with high accuracy. And, the reflected light is not reflected by the splitter 73 and does not to strike on the laser 71 as return light, there is no problem of output fluctuation by return light in spite of low power driving of the laser 71. It is another case to recording on the WORM type optical disc that the return light does not strike on the laser 71.

If the direction of a crystal axis of the λ/4 plate 84 is parallel or perpendicular to the polarization direction of incident light, the state of polarization of the transmitted light remains unchanged. Therefore, instead of putting λ/4 plate 84 in and out the optical path as this embodiment, the λ/4 plate 14 may be rotated within an optical path by a suitable rotating means in such a manner that the crystal axis 87 of the λ/4 plate 84 is oriented at the angle of 45° with respect to S-polarization direction 88 as shown in FIG. 17(A) in a case where the recorded media 76 is the WORM type optical disc, and the crystal axis 87 of the λ/4 plate 84 is oriented at the angles of 0° or 90° as shown in FIG. 17(B) in a case where the recorded media 76 is the magneto-optical disc.

Distinction and switching of the magneto-optical mode and the WORM type mode may be made by user's judgement and by means of a switch and the like, or may be made automatically by detecting the mark or the like put on an optical disc cartridge.

To locate the λ/4 plate 84 at a position where luminous flux is of parallel rays as in the embodiment, does not cause errors, because, even if there is an error in a parallelism between the both faces of the λ/4 plate 84, the direction of light passing through the λ/4 plate 84 is in parallel with the incident direction of the light on striking from the splitter 73 to the λ/4 plate 84.

Many widely different embodiments of the present invention may be constructed without departing from the spirit and scope of the present invention. It should be understood that the present invention is not limited to the specific embodiments described in this specification, except as defined in the appended claims.

What is claimed is:

1. An optical pickup device with a dual-mode drive mechanism for use selectively with a WORM (write-once-read-many) optical disc or an MO (magneto-optical) disc, comprising:
    a semiconductor laser for emitting a laser light;
    an objective lens for converging said laser light emitted by said laser on a recording medium to be reflected thereby as reflected light;
    a photo-detector for receiving light reflected from the recording medium;
    a beam splitter which is in an optical path of the emitted light and is between the laser and the objective lens and is in the path of the reflected light and is between the recording medium and the photo-detector and directs the reflected light to the photo-detector, said beam splitter reflecting 75% of s-polarized light and transmitting 99% of a p-polarized light;
    a first quarter-wave plate which is in, and is mounted for rotation around, an optical path between said beam splitter and said objective lens;
    a rotating means for rotating said first quarter-wave plate between: (i) a first rotary position in which an optical axis of said first quarter-wave plate is at an angle of 45° with respect to a vibration direction of s-polarized light reflected from said beam splitter to thereby change s-polarized light reflected from the recording medium into circularly-polarized light and change circularly-polarized light reflected from the recording medium into p-polarized light in a case where said recording medium is a WORM optical disc; and (ii) a second rotary position in which said optical axis of said first quarter-wave plate matches said vibration direction to thereby change linearly-polarized light reflected from said recording medium into elliptically-polarized light in a case where said recording medium is an MO disc; and
    a second quarter-wave plate which is between said beam splitter and said photo-detector and has an optical axis at right angle with respect to said vibration direction to change said elliptically-polarized light passed through said beam splitter into linearly-polarized light in said case where said recording medium is an MO disc.

2. A device according to claim 1, wherein said rotating means comprises:
    a bearing having an outer ring and an inner ring both of which are engaged rotatably with each other, one of said outer ring and said inner ring being fixed to said first quarter-wave plate and the other of said outer ring and said inner ring being fixed to a stationary member;
    a first generating means fixed to said stationary member for generating a magnetic field along a substantially rotational direction of said bearing; and
    a second generating means fixed to said first quarter-wave plate for generating another magnetic field along said substantially rotational direction.

3. A device according to claim 2, wherein said first generating means comprises an annular metal element and a permanent magnet fixed to one side of said annular metal element.

4. A device according to claim 3, wherein said second generating means comprises a coil through which the other side of said annular metal element passes.

5. An optical pickup device with dual-mode drive mechanism, comprising:
- a semiconductor laser for emitting a laser light;
- an objective lens for converging said laser light emitted by said laser on a recording medium to be reflected thereby as reflected light;
- a photo-detector for receiving said reflected light;
- a beam splitter reflecting 70% of s-polarized light and transmitting 100% of p-polarized light, arranged in an optical path of the emitted light to lead emitted light from said laser to said objective lens and in an optical path of said reflected light to lead reflected light to a photo-detector;
- a quarter-wave plate disposed rotatably around an optical path between said beam splitter and said objective lens; and
- a rotating means for rotating said quarter-wave plate between: (i) a first rotary position in which an optical axis of said quarter-wave plate is at an angle of 45° with respect to a vibration direction of s-polarized light reflected from said beam splitter to thereby change said reflected s-polarized light into circularly-polarized light and change circularly-polarized light reflected from said recording medium into p-polarized light in a case where said recording medium is a write-once-read-many optical disc; and (ii) a second rotary position in which said quarter-wave plate is at an angle of one of 0° and 90° with respect to said vibration direction in a case where said recording medium is a magneto-optical disc.

6. A device according to claim 5, wherein said rotating means comprises:
- a bearing having an outer ring and an inner ring both of which are engaged rotatably with each other, one of said outer ring and said inner ring being fixed to said quarter-wave plate, the other of said outer ring and said inner ring being fixed to a stationary member;
- a first generating means fixed to said stationary member for generating a magnetic field along a substantially rotational direction of said bearing; and
- a second generating means fixed to said quarter-wave plate for generating another magnetic field along said substantially rotational direction.

7. A device according to claim 6, wherein said first generating means comprises an annular metal element and a permanent magnet fixed to one side of said annular metal element.

8. A device according to claim 7, wherein said second generating means comprises a coil through which the other side of said annular metal element passes.

* * * * *